INVENTOR.
Rolland B. Wallis
BY
Ronald L. Phillips
ATTORNEY

United States Patent Office 3,416,307
Patented Dec. 17, 1968

3,416,307
VARIABLE POWER AND VARIABLE DIRECTION ENGINE AND SPLIT TORQUE PHASE CHANGING DEVICE
Rolland B. Wallis, La Grange Park, Ill., assignor to General Motors Corporation, Detroit, Mich., a corporation of Delaware
Filed Aug. 31, 1966, Ser. No. 576,464
10 Claims. (Cl. 60—24)

ABSTRACT OF THE DISCLOSURE

A variable power and variable direction hot gas engine in the preferred embodiment has a phase changer providing a split torque drive between the engine's power and displacer mechanisms. In one power path there is a fluid coupling whose torque transmitting characteristics are matched to the displacer mechanism's torque requirements when the phase relation of the mechanisms is fixed, this power path continuously transmitting a major portion of the power required to normally drive the displacer mechanism. The other power path which transmits the remaining portion of the torque requirements for the displacer mechanism includes infinitely variable phase drive means for normally maintaining the mechanisms in a fixed phase relation and for momentarily changing their phase relation to establish a new phase relation.

---

This invention relates to a variable power and variable direction hot gas energy transforming device having a phase changer and more particularly to a phase changer employing a split torque drive and to said drive.

In the Stirling cycle engine, which is a typical form of hot gas energy transforming device, there is generally provided a power piston and a displacer piston powered by the power piston. The engine is usually constructed in such a manner that with a predetermined and fixed phase angle between the power piston and the displacer piston, maximum engine power is obtained. This predetermined phase angle may be 90°, for example, and from a constructional point of view a larger phase angle may be impossible because of clearance between the power piston and the displacer piston; however, a smaller phase angle is possible. As the phase angle approaches zero, the engine power approaches zero and if the phase angle becomes negative, which negative angle and accompanying engine power may approach the same values as the maximum positive angle and accompanying engine power, the engine power output take-off is caused to rotate in the opposite direction. Thus, by modifying or changing the pistons' phase relation, it is possible to control the engine's power output from zero power output to maximum power output and also to change the output drive direction.

Controlling the phase relation between the power and displacer pistons in a Stirling cycle engine is feasible and prior work has resulted in phase changing devices such as shown in United States Patent No. 2,465,139, Van Weenan et al., and United States Patent No. 2,508,315, Van Weenan et al. However, it has been found that the power required to change the phase relation can impose a considerable power requirement on the phase changing device which is additive to the normal power transmitting ability required of the phase changer when the phase changer serves as a full displacer power transmitting link. In a Stirling cycle engine, the power required to drive the displacer mechanism is determined by the following three main components:

(1) The power loss in the displacer mechanism resulting from friction in the mechanism's bearings, seals, etc.;

(2) The power required to perform the gas transfer pumping work which comprises the displacer function; and (3) The power required to overcome the inertial loading resulting from changing the phase relation within a finite time.

While the first two components have predictable values for each engine and depend on the operation of the engine and combine to give a resultant which is a function of engine speed, the third component is a transient varying in magnitude and direction.

It has been found that a phase changer may be relieved of all or a major portion of these predictable power components to enable the use of smaller power capacity phase changers, simplification of the phase changer structure and reduction of the power requirements for controlling the phase changer. This is highly desirable since the provision of an efficient low cost phase changer which will vary the Stirling cycle engine output power and drive direction greatly expands the engine's usage and mass production possibilities.

In the present invention the hot gas engine has a phase changing device employing a split torque power train for connecting the power mechanism to the displacer mechanism with a pair of power paths. One power path transmits all or a major portion of the power required to drive the displacer mechanism when the phase relation is fixed and permits phase change while still transmitting a significant portion of the power. The other power path has a phase change control for fixing and changing the phase relation to a new value by momentarily varying the relative rate of angular movement and is relieved of at least most of the normal or base displacer power requirements by the former power path.

In the preferred embodiment of the engine and device of the present invention, the phase changing device comprises a power drive in parallel with a differentially geared phase drive to provide two power paths, one hydraulic and the other mechanical, connecting the power piston crankshaft to the displacer piston crankshaft. The fluid coupling is geared to a predetermined slip or coupling speed ratio to give the desired torque and power split between the mechanical and hydraulic power paths thus provided so that the hydraulic power path transmits the predictable power required to drive the displacer mechanism. Since the phase drive is substantially relieved of the normal or base load displacer power requirements, only the additional power to meet the demands of the transient loads occurring during phase change and accompanying change of the fluid coupling slip is left to be made up by the phase drive providing the mechanical power path. Phase control is effected by a bidirectional output servomotor connected to the differential carrier. When the servomotor is operated to hold the carrier, the phase angle is fixed. When the servomotor is operated to drive the carrier, carrier motion in one direction acts to increase the phase angle and in the opposite direction acts to decrease the phase angle.

An object of this invention is to provide a variable power and variable direction hot gas engine having an improved phase changer.

Another object of this invention is to provide a hot gas engine having an improved phase changer requiring a low control force for changing phase.

Another object of this invention is to provide a hot gas engine having a phase changer employing a split torque drive between the power and displacer mechanisms providing a power drive whose torque transmitting characteristics are matched to the displacer torque requirements when the phase relation of the mechanisms is fixed and permits phase change while still transmitting a major portion of the power required to drive the displacer and a phase drive for fixing and changing the phase relation.

Another object of this invention is to provide a Stirling cycle engine having a phase changer employing a power path drive between the power and displacer mechanisms continuously transmitting a major portion of the power required to normally drive the displacer mechanism and a phase changing drive for fixing and changing the phase relation of the power and displacer mechanisms.

Another object of this invention is to provide a Stirling cycle engine having a phase changer employing a split torque drive with a power path drive between the power and displacer mechanisms having a fluid coupling having torque transmitting characteristics matched to the displacer mechanism's torque requirement characteristics so that the power path drive continuously transmits substantially all the power required to satisfy the normal displacer mechanism power requirements and a phase drive for fixing and changing the phase relation of the mechanisms to a new value by momentarily varying the rate of their relative angular movement.

Another object of this invention is to provide a phase changing device having one power path for transmitting normal power requirements and another power path for transmitting transient power requirements.

Another object of this invention is to provide a phase changing device providing two separate power paths between a pair of angularly movable members with one power path transmitting at least a major portion of the total power transmitted when the angular relation of the members is fixed and permitting relative angular movement between the members while still transmitting a significant portion of the power and the other power path fixing and varying the angular relation of the members.

Another object of this invention is to provide a phase changing device having a pair of power paths between a driving member and a driven member with one power path having a fluid coupling for apportioning torque and power between the power paths so that the one power path transmits substantially all the power required to drive the driven member when the phase relation of the members is fixed and continues to transmit substantially all the power required to drive the driven member during a phase change and phase drive means in the other power path for normally maintaining the members in a fixed phase relation and for changing the phase relation.

These and other objects of the invention will be more apparent from the following description and drawing in which.

Figure 1:
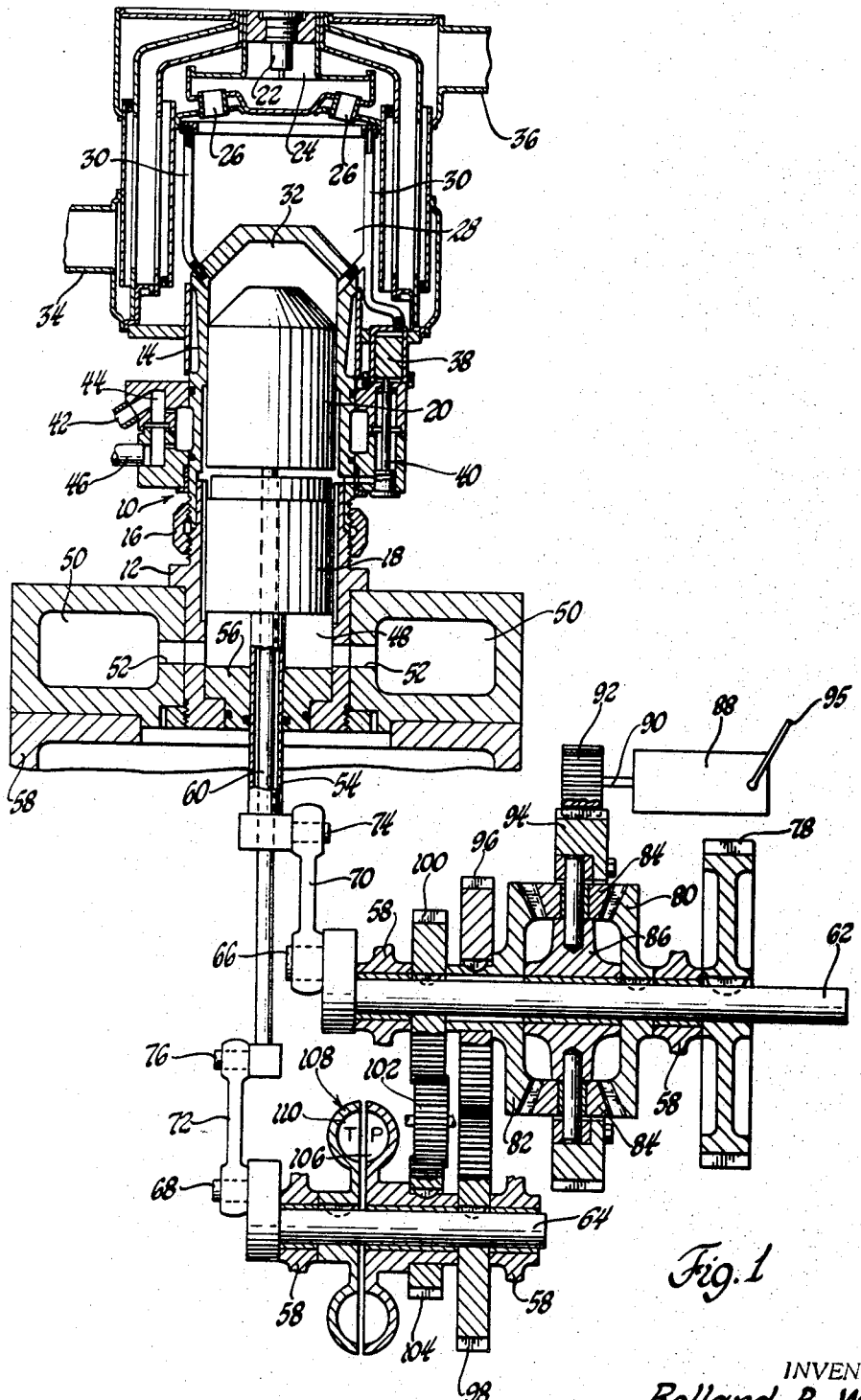
FIGURE 1 is a fragmentary cross-sectional view of a typical hot gas energy transforming device in which the phase changing device according to this invention is employed.

Referring to the drawing, FIGURE 1 illustrates the invention, a hot gas energy transforming device in the form of a Stirling cycle engine having a phase changing device requiring a low control force for changing phase. The engine has a cylinder 10 which may be formed in any suitable fashion and for illustrative purposes is shown to include a lower portion 12 and an upper portion 14 secured together by a threaded ring 16. A power piston 18 is received in the cylinder 10 beneath a displacer piston 20 as in the usual construction. A burner nozzle 22 extends into a pre-oxidation chamber 24 which is connected by swirl passages 26 to the burner combustion chamber 28. Suitable heater tubes 30 in the combustion chamber 28 communicate with the expansion chamber 32 in the cylinder 10 above the displacer piston 20. An air inlet 34 provides air to the combustion chamber and an exhaust outlet 36 conveys the air and products of combustion from the engine. A suitable regenerator 38 and cooler 40 are disposed adjacent the cylinder 10 for passage of the operating fluid from one end of the cylinder 10 to the other end in the usual manner. A coolant inlet passage 42 conveys coolant to an annular chamber 44 communicating with the cooler 40 and a coolant outlet 46 conveys the coolant from the engine. A buffer space 48 is provided in cylinder 10 beneath the piston 18 and in communication with an annular chamber 50 through suitable passages 52.

Piston 18 is provided with a hollow piston rod 54 which is secured to the underside of the piston in any suitable manner and extends axially therefrom through a sealed closure member 56 and into the engine frame 58 which supports cylinder 10. Piston 18 is provided with an axial bore to permit the passage of a displacer piston rod 60 which extends axially from its connection to the lower surface of the displacer piston 20 through the power piston 18 and through the hollow piston rod 54 into the engine frame. This reciprocating structure is all symmetrical and coaxial about the central axis of the cylinder. The engine construction thus far described is all well known and is the usual manner of constructing an engine to operate using the Stirling cycle with the engine power also being used to power the displacer via a drive connection between the power and displacer piston rods.

The engine has a phase changing device providing two parallel power paths for transmitting power from the power piston 18 to drive the displacer piston 20 and for fixing and varying their phase relation or relative phase angle and comprises a power crankshaft 62 and a displacer crankshaft 64. The axes of the crankshafts are parallel and perpendicular to the axis of the engine cylinder 10; the crankshafts being suitably journaled on the engine frame 58. Crankshafts 62 and 64 are provided with cranks 66 and 68, respectively, to permit driving in a manner conventional to crankshafts. Oscillatory connecting rods 70 and 72 are journaled at one end on the cranks 66 and 68, respectively, and are journaled at the other end on connecting rod pins 74 and 76, respectively, the pins 74 and 76 being secured to the lower end of the reciprocating rods 54 and 60, respectively. An engine power take-off spur gear 78 is for transmitting engine power output from the power crankshaft 62 to drive the driven load.

The power crankshaft 62 is connected by both a mechanical phase changing drive and a hydraulic power path drive to drive the displacer crankshaft 64. The mechanical power path which effects change in the phase relation of the pistons by changing the relative angular relation of the crankshafts 62 and 64 is provided by phase drive means comprising a differentially geared phase change control or adjuster having a pair of bevel side gears 80 and 82. Gears 80 and 82 mesh with diametrically opposite sides of bevel pinions 84 which are journaled on a carrier 86, carrier 86 being journaled on power crankshaft 62. Gear 80 is the driving member and is secured to the power crankshaft 62 and gear 82 is the driven member and is journaled on the power crankshaft.

A suitable phase change actuator is provided by the bidirectional output servomotor 88 mounted on the engine frame. The servomotor controls the carrier 86 and has a motor shaft 90 to which is secured a spur gear 92 in mesh with a spur gear 94 secured to carrier 86. Servomotor 88 may be operated by its control 95 to hold the carrier 86 in a fixed angular position and also to angularly move the carrier in either of its two possible directions and at a controlled rate as discussed in greater detail later. The servomotor is of conventional structure and may be of the electric, hydraulic or pneumatic type and operated according to some predetermined schedule and by a governor mechanism.

A spur gear 96 secured to the driven differential gear 82 meshes with a spur gear 98 of the same diameter secured to the displacer crankshaft 64 to complete the mechanical drive between the two crankshafts. When carrier 86 is held by the servomotor, displacer crankshaft 64 is required by the differential drive to rotate in the same direction and at the same speed as the driving power crankshaft 62 with 1:1 speed ratio drive provided by the mechanical power path. Alternatively, when the carrier is angularly moved in either of its two possible directions by the servomotor, the differential drive changes the speed ratio. The speed ratio change requires the displacer crankshaft to either speed up or slow down relative to the power crankshaft as determined by the direction of carrier movement to thereby change the relative phase angle between the crankshafts and thus the phase relation of the pistons to a new value which can be fixed by again holding the carrier.

Describing now the hydraulic power path providing the power drive between the crankshafts, a spur gear 100 is secured to the power crankshaft 62 and meshes with an idler spur gear 102 suitably journaled on the engine frame. Gear 102 is in mesh with a spur gear 104 secured to the pump 106 of a fluid coupling 108; the pump being journaled at its hub on the displacer crankshaft 64. The fluid coupling turbine 110 is secured at its hub to the displacer crankshaft 64 and thus completes the hydraulic drive between the crankshafts observing that the idler gear provides the necessary rotational direction to drive the pump and thus the turbine and displacer crankshaft 64 in the same direction as the power crankshaft 62.

Figure 2:
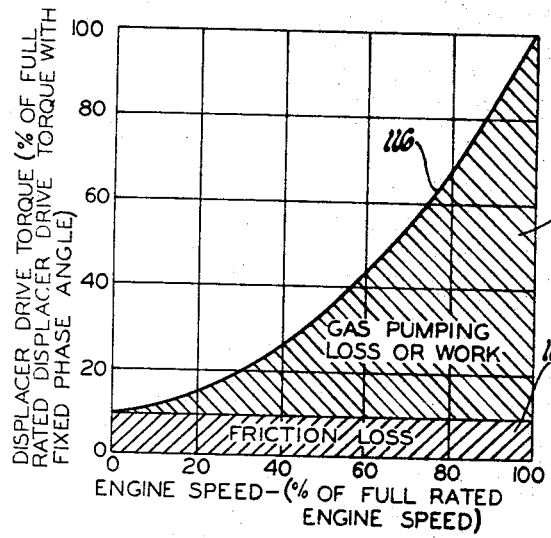
FIGURE 2 illustrates the general nature of the torque requirements for the displacer mechanism.

The normal power requirements of a Stirling engine displacer mechanism with the phase angle fixed is a function of the gas pumping loss or work which is a function of speed and the friction loss, as illustrated in FIGURE 2 by the gas pumping loss 112, and a small and constant friction loss 114. These losses are additive and combine to produce a displacer drive torque requirement as generally represented by the curve 116 in FIGURE 2, bearing in mind that power is the product of torque and speed. It will be observed in FIGURE 2 that engine speed (power crankshaft speed) is presented as a percentage of full rated engine speed and that displacer drive torque with the phase angle fixed is presented as a percentage of full rated displacer drive torque which occurs at full rated engine speed. It has been found that the power requirement of the displacer mechanism is generally in the range of approximately 6–10% of the total engine power extracted by the power mechanism which includes the power piston.

Figure 3:
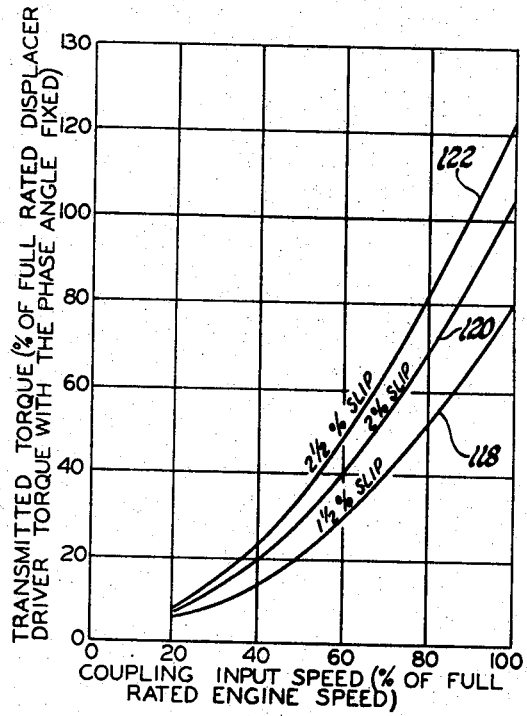
FIGURE 3 shows typical coupling performance characteristics of a type which may be used in the present invention.

The performance characteristics of the fluid coupling 108 are shown in FIGURE 3 with the curve 118 representing a 1½% slip, the curve 120 representing a 2% slip and the curve 122 representing a 2½% slip. In FIGURE 3, it will be observed that coupling input speed (pump speed which is also power crankshaft speed) is presented as a percentage of full rated coupling input speed which is equivalent to full engine rated speed and that the torque transmitted by the fluid coupling is presented as a percentage of full rated displacer drive torque with the phase angle fixed.

Since the major component of the displacer piston drive is a pumping loss which has a parabolic torque characteristic, the fluid coupling 108, which also has a parabolic torque capacity characteristic can provide a close correlation for torque matching over the entire speed range with the phase angle fixed. Since with this particular fluid coupling there cannot be a perfect match throughout the entire speed range, the fluid coupling is matched to the displacer drive requirements at a speed where the engine is expected to primarily operate which may be full rated engine speed. However, it has been found that the engine torque in the low speed range is almost equal to the engine torque in the high speed range so that close torque matching is maintained throughout the entire speed range.

The torque and power apportionment between the parallel mechanical and hydraulic power paths is determined by the slip at which the fluid coupling operates. This slip is established by selecting the gear ratio between the power crankshaft 62 and the pump 106 provided by gears 100 and 104, which gears thus serve as timing gears, so that when the carrier 86 is held by the servo to fix the phase relation, a normal coupling speed ratio or normal base load slip is enforced between the coupling members 108 and 110. This normal slip and thus the torque capacity of the fluid coupling is selected so that the hydraulic power path transmits substantially all the power needed to meet the base load requirements of the displacer to relieve the mechanical power path of this power transmission. As illustrated in the embodiment, the normal base load slip is selected at 2%, which as shown in FIGURE 3 by the curve 120 will condition the fluid coupling 108 to transmit a torque excess of about 4% at full rated engine speed to provide close matching between the displacer mechanism power requirement and these particular coupling characteristics.

Figure 4:
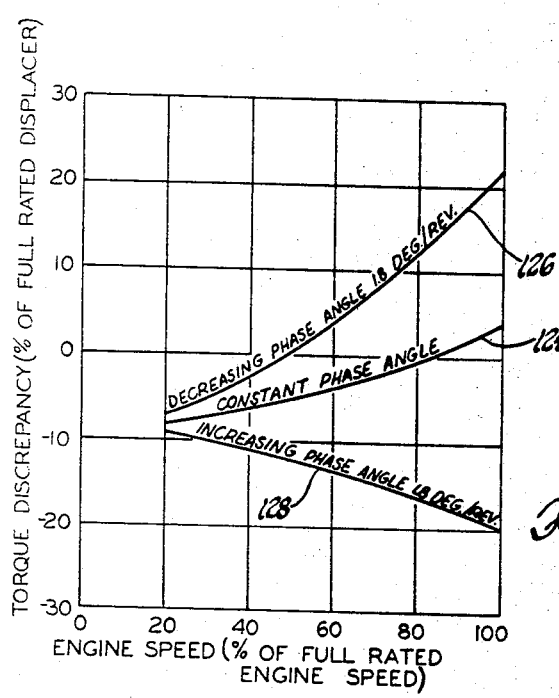
FIGURE 4 shows typical mechanical torque requirements for phase control of a displacer mechanism by a phase changer which may be used in accordance with the present invention.

The constant phase angle torque match realized is shown in FIGURE 4 by the curve 124. In FIGURE 4, the engine speed is presented as a percentage of full rated engine speed and the hydraulic power path torque discrepancy or the mechanical power path torque requirement, which is the difference between the torque transmitted by the hydraulic power path via the fluid coupling and displacer drive torque requirements, is presented as a precentage of full rated displacer drive torque.

It will be observed in FIGURE 4, that with the phase angle fixed by the phase drive, the hydraulic power path transmits a torque shortage of —8% at 20% of full rated engine speed which becomes less negative with increasing speed until approximately 81% of full rated engine speed is reached at which point there occurs a perfect match. Thereafter, the hydraulic power path transmits excess torque which increases with increasing speed until the maximum excess of 4% is reached. Below 81% of full rated engine speed, the deficiency in torque of the hydraulic power path is made up by the mechanical path to increase the speed of the displacer mechanism which operation imposes reaction requirements on the servomotor. Above 81% of full rated engine speed, the excess torque transmitted by the hydraulic power path requires the mechanical power path to decrease the speed of the displacer mechanism which operation also imposes reaction requirements on the servomotor. However, since the reaction requirements are limited to a maximum of 8% and displacer power requirements are 6–10% of total engine power, the reaction requirements imposed on the servomotor are small in comparison with phase adjusters carrying the full displacer power requirement.

When changing the phase relation of the crankshafts and their respective pistons by operation of the servomotor, the coupling slip is changed and for demonstration purposes a phase change rate of 1.8° per engine revolution has been selected to change from the normal base slip of 2% to either the 1½% slip to increase the phase angle or the 2½% slip to decrease the phase angle.

For example, to decrease phase angle and as shown in FIGURE 4, the mechanical path of the split torque drive must slow the displaced crankshaft 64 and in doing so increase the fluid coupling slip to the 2½% curve 122 in FIGURE 3. The mechanical power path torque requirement or torque discrepancy of the hydraulic power path occurring with decreasing phase angle is illustrated by the curve 126 in FIGURE 4. The difference between the coupling torque and the displacer drive requirement must be supplied by the mechanical path. At 20% engine speed, the torque discrepancy is —7% and this discrepancy becomes more positive with increasing speed with zero torque discrepancy occurring at about 45% engine speed.

mild mechanical treatment may, for instance, consist of striking, rubbing, brushing, or vibrating. Such treatment during the electrical treatment will not only fold out but also spread the material out.

At this point in the flow sheet of FIGURE 1 the sheet material is in a spread-out condition wherein the individual fibrils, making up the material, are parallel to the longitudinally axis of the sheet material. In many cases, and for many applications, this is a desirable configuration. However, for certain textile products the yarn used in the manufacture therein should not be lean and smooth but rather should have a high percentage of loose fibrils along the surface of the web or sheet as the case may be. For instance, in the case of blankets, carpets, and fabrics made from woolen yarns, it is essential to use a bulky yarn which is not produced under the process described in the above-identified patent.

My invention resides in forming a pile fabric from this polymeric sheet material as it emerges from the folding-out step.

With reference to FIGURES 2 and 3, after the sheet material 10 has been folded out as described hereinabove, it passes between a pair of generally cylindrical rollers 12 and 13, which are rotatably mounted in frame plates 14 and 16 respectively. These frame plates 14 and 16 extend vertically from a base plate 18 which is mounted on wheels 20. This unit is able to be wheeled into a position to receive the film 10 directly from the folding-out step described in FIGURE 1 in the event that it is desirable to make the whole process continuous. The sheet or web 10 passes from the rollers 12 and 13 to a roller 54 (see FIGURE 6) which is also rotatably mounted in plates 14 and 16.

With reference to FIGURE 6, a plurality of rollers 54 are shaped to form a crown 56 at their centers. As a result, the fibrils in the central portion of film 10 passing over the crown 56 will break while those in the edge portion of the film passing over the edge of the roller will not. This action of crowned rollers 54 (FIGURE 2) causes the fibrils in the center portion of sheet 10 to break. This web is particularly useful in making yarn and as such it is twisted by conventional yarn twisting means as it is wound onto a spool 58.

As shown in FIGURES 2 and 3, rollers 13, 54 (only one roller is shown; however, it would be within the skill of the art to connect a plurality of crowned rollers into the mechanism) and 29 are connected to a suitable driving mechanism 30. This mechanism comprises an endless belt or chain 32 which passes over a pulley or sprocket 34 which is fixed to roller 54, then over a sprocket 36 which is fixed to roller 13, then over a sprocket 38 which is fixed to roller 29, then over an idler sprocket 40, then over a drive sprocket 42, which is driven by any suitable power source such as electric motor 44, and finally back over sprocket 34. The rollers 12, 13, 54, 28, and 29 are rotated in the directions shown by the arrows.

With reference to FIGURE 4, roller 22 is provided with a plurality of grooves 24 and a plurality of needles 26 or other similar sharp, pointed implements, which project radially from the center of the grooves 24. These needles may be secured in the grooves 24 in any suitable manner. As the sheet 10 passes over the roller 22, portions of it are channelled into the grooves 24 and become impaled upon the needles which penetrate through the sheet material and cause a portion of the individual fibrils to be severed. The degree of breakage would be determined by the number of grooves in the roller and the number of pins in the grooves; however, no more than one-half of the fibers passing over the roller should be broken in order to retain sufficient web strength. In the preferred embodiment we show only one roller but it would be within the skill of the art to adapt a plurality of rollers over which the film could be passed. The film after passing over the pin-studded roller 22 is received by a pair of pick-up rollers 28 and 29 which are also rotatably mounted in the frame plates 14 and 16. These rollers feed the bulky sheet material to a suitable take-up mandrel (not shown).

FIGURE 5 illustrates another embodiment of my invention. In this embodiment a roller 46 contains a plurality of grooves 48 around the perimeter thereof. These grooves are cut at an angle of 45° to the horizontal axis 50 of the roller 46. This roller 46 is attached to frames 14 and 16 in place of roller 22. A plurality of knife blades 52 are positioned around the circumference of roller 53 rotatably mounted between the vertical frames 14 and 16 a predetermined distance from roller 46. The sheet 10 is passed between the roller and the blade. The blade 52 is rotated in close enough proximity to the roller 46 so that portions of the film 10 pass over the crown of the grooves 48 and are cut by the rotating blades 52. Because of the angle of inclination of these grooves a discontinuous chopping of the individual fibrils results without cutting entirely across the sheet itself. The strength of the sheet itself is not significantly affected. This fabric possesses a tremendous advantage over a normal pile fabric because the pile fibers form an integral part of the sheet and are firmly anchored to the surface of the sheet.

In order to illustrate with greater particularity and clarity the operation of my process, the following examples are offered as illustrative of the operation thereof. The specific materials and conditions given in the examples are presented as being typical and should not be construed to limit my invention unduly.

EXAMPLE I

A 60-inch wide fibrillated web of 0.8 mil polyethylene, having a density of 0.95 gram/cc. and a melt index of 0.3 (ASTM D 1238–5DT, Condition E), is threaded through the machine described in FIGURE 2. A chopper roller 53 is provided with 12 tempered spring steel blades 52 around its circumference. The blades 52 coact with a 12-inch diameter grooved roller 46, made of mild steel and coated to a thickness of 60 mils with 80 durometer rubber. Each groove 48 in roller 46 defines an ellipse in a plane making a 45° angle with the roller axis. These grooves are 1/8-inch wide, 1/8-inch deep, and spaced so that their centers are 1/4-inch apart, and having all their edges and corners chamfered and rounded on a 1/16-inch radius. Bulk film is fed to roller 12 at the rate of 20 feet per minute while the machine is being adjusted to insure clean, uniform cuts. After adjustment, the rate is increased to 150 feet per minute and about 2000 feet of the material is fed through the machine.

Air filters 2½ feet square are produced from some of this material by laminating 21 layers of this bulked film together, each layer being laid at right angles to the adjacent layers 21 and being stitched together in both directions across the film at 6-inch intervals with cotton string and subsequently edged with an aluminum channel having a 1/8-inch flange.

In another application ten 8-foot sections of this bulked fibrilated web are stitched together on 4-inch centers both lengthwise and crosswise and the edges bound to make an exceptionally warm, lightweight blanket.

Example II

The rollers 46 and 53 are replaced with a 12-inch diameter pin-studded roller 22 similar to that shown in FIGURE 4. The grooves 24 are ½-inch center-to-center with a sharp 60° included angle peak between the grooves. In each groove 36 equally spaced cylindrical pins 26 are positioned wherein each pin is 3/32-inch in diameter and has a flat, sharp edged top portion located 3/32-inch below the peaks. Web material similar to that used in Example I is threaded through the machine and the machine is started and run at an initial rate of about 15 feet per minute output while adjustments of the film tension over the pin-studded roller 22 are made. After adjustment, the rate is increased to 150 feet per minute to produce approximately necting said members providing two separate power paths between said members, power apportioning means in one power path for apportioning power between said power paths so that said one power path transmits at least a major portion of the total power transmitted by both said power paths when the angular relation of said members is fixed and also for permitting relative angular movement between said members while still transmitting a major portion of the power, phase control means in the other power path for fixing and varying the angular relation of said members, said phase control means comprising differential gearing having a carrier rotatably supporting a pinion, a drive gear connected to one of said members and meshing with said pinion and a driven gear connected to the other of said members and meshing with said pinion, and means operatively connected to said carrier for holding said carrier to fix the angular relation of said members and for driving said carrier to vary the angular relation of said members.

References Cited

UNITED STATES PATENTS

| | | | |
|---|---|---|---|
| 2,949,793 | 8/1960 | Suri | 74—720 X |
| 3,315,465 | 4/1967 | Wallis | 60—24 |

FOREIGN PATENTS 1,013,602  12/1965  Great Britain.

DONLEY J. STOCKING, *Primary Examiner.*

T. C. PERRY, *Assistant Examiner.*

U.S. Cl. X.R.

62—6; 74—675, 720

UNITED STATES PATENT OFFICE
CERTIFICATE OF CORRECTION

Patent No. 3,416,307                          December 17, 1968

Rolland B. Wallis

It is certified that error appears in the above identified patent and that said Letters Patent are hereby corrected as shown below:

Column 6, line 65 and column 8, line 31, "displaced", each occurrence, should read -- displacer --.

Signed and sealed this 17th day of March 1970.

(SEAL)
Attest:

Edward M. Fletcher, Jr.
Attesting Officer

WILLIAM E. SCHUYLER, JR.
Commissioner of Patents